May 29, 1962 G. E. MALLINCKRODT 3,036,794
AIRCRAFT
Filed Sept. 3, 1959 5 Sheets-Sheet 2

George E. Mallinckrodt,
Inventor.
Koenig and Pope,
Attorneys.

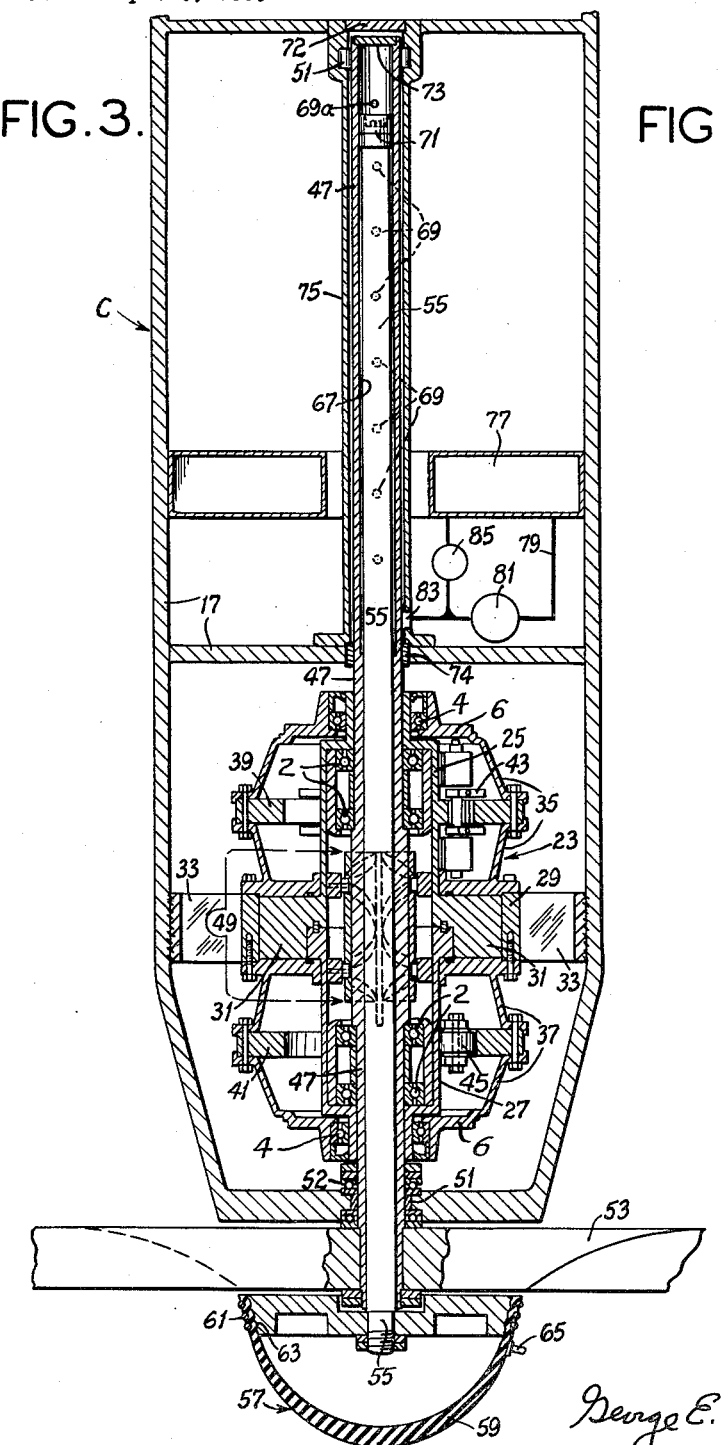

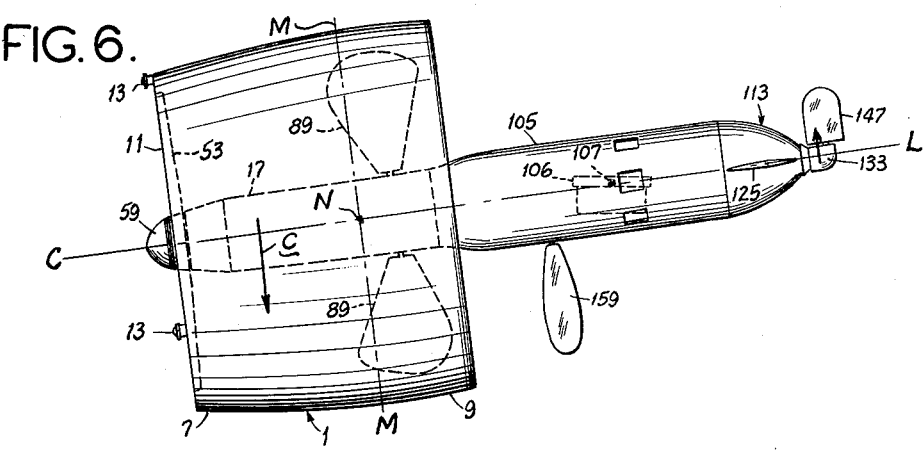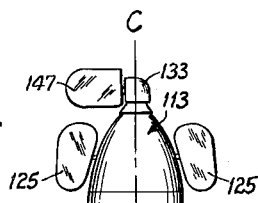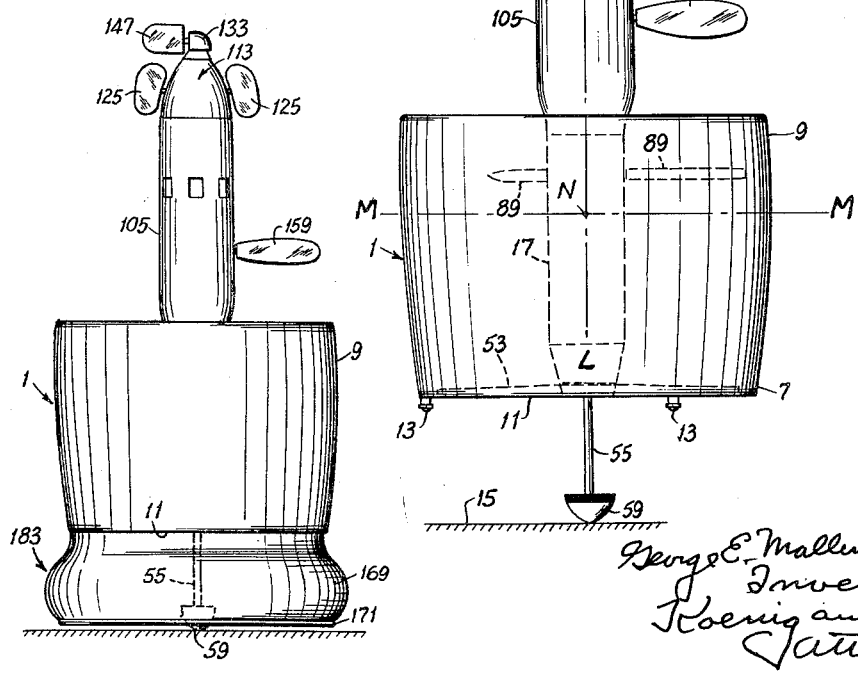

May 29, 1962 G. E. MALLINCKRODT 3,036,794
AIRCRAFT

Filed Sept. 3, 1959 5 Sheets-Sheet 5

George E. Mallinckrodt,
Inventor.
Koenig and Pope,
Attorneys.

United States Patent Office 3,036,794
Patented May 29, 1962

3,036,794
AIRCRAFT
George E. Mallinckrodt, 20 Kingsbury Place,
St. Louis, Mo.
Filed Sept. 3, 1959, Ser. No. 837,948
13 Claims. (Cl. 244—12)

This invention relates to aircraft, and with regard to certain more specific features, to aircraft combining in flight both helicopter and airplane aerodynamic characteristics, with gyroscopic control for maneuvering along a desired trajectory, being an improvement upon the aircraft shown and described in my United State Patent No. 2,874,920, for Aircraft.

Among the several objects of the invention may be noted the provision of an aircraft having the characteristics set forth in said Patent 2,874,920 and including:

(A) Improved means for maintaining stability against yawing or pitching during flight;

(B) A resilient one-point landing means affording shockless landing characteristics;

(C) Improved means for stabilization of the position of its load compartment; and, (D) A comparatively simple structure of light-weight and compact form having the above-mentioned features. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is diagrammatically illustrated, FIG. 1 is a side elevation, partly in section, showing the aircraft in rest position in which its landing gear is retracted;

FIG. 3 is an enlarged fragmentary vertical section taken on line 3—3 of FIG. 2, showing lower prime mover and landing gear elements, the latter being in the retracted position shown in FIG. 1;

FIG. 4 is a fragmentary detail section of parts of FIG. 1, showing certain landing gear elements in an extended landing position;

FIG. 5 is a side elevation of the aircraft shown in landing position with its landing gear extended as in FIG. 4;

FIG. 6 is a side elevation of the aircraft in a cruising position, with certain elevators turned 90° from their positions shown in FIG. 1;

Corresponding reference characters indicate corresponding parts throughout the several views of the drawings.

Figure 1:
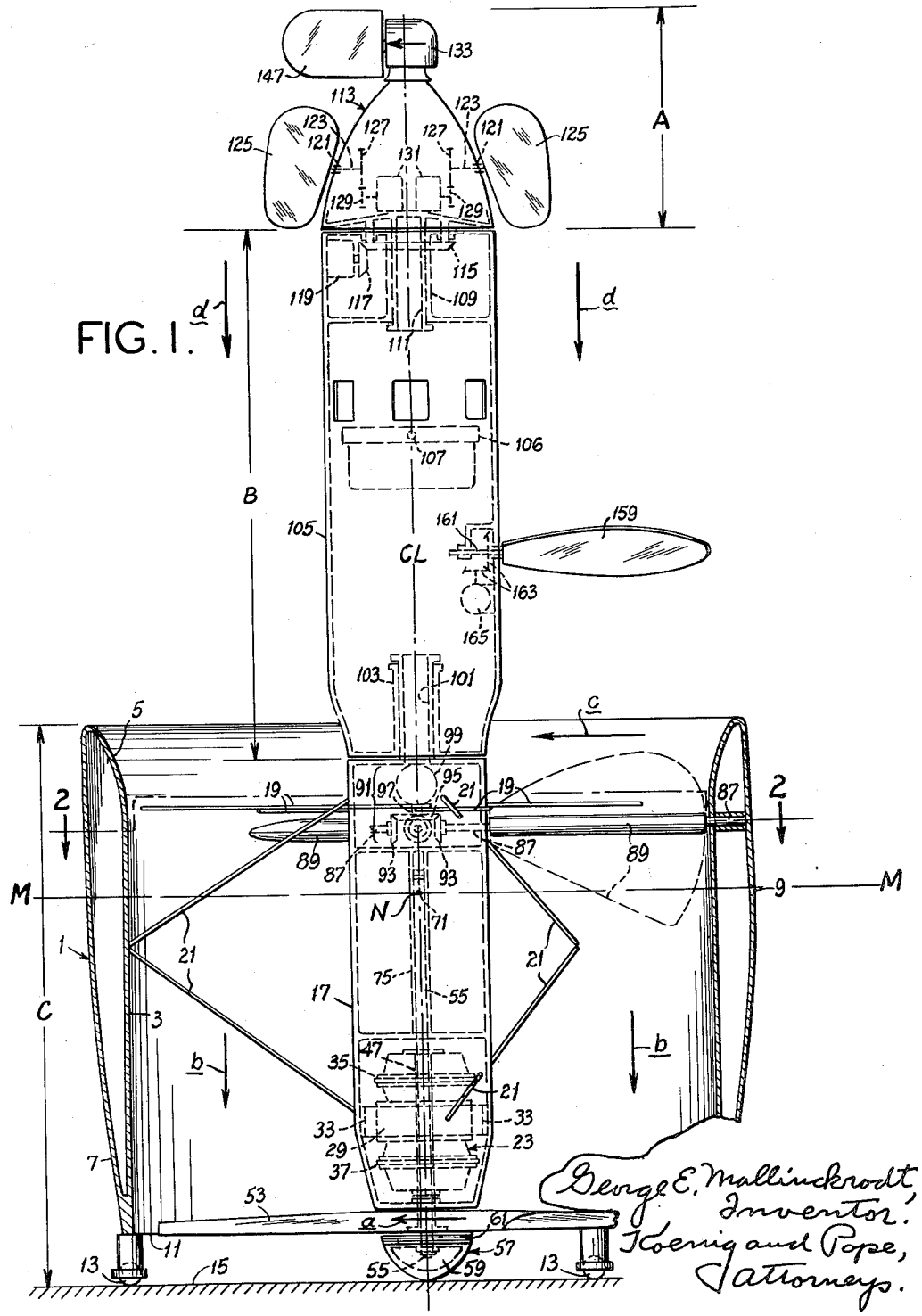
Figure 2:
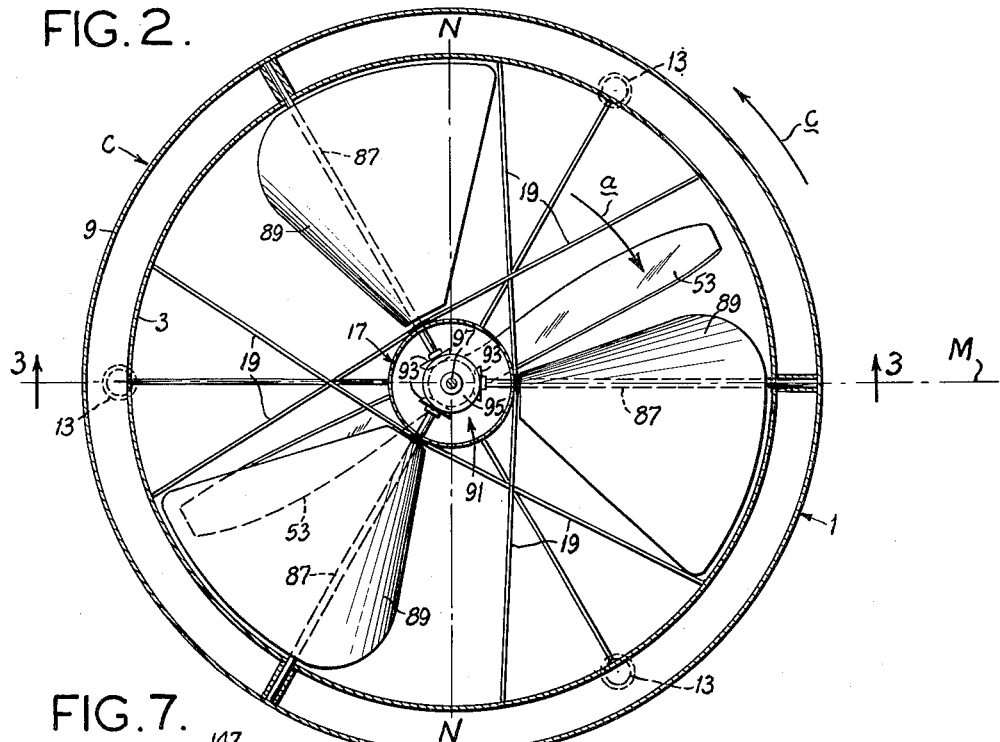
FIG. 2 is a transverse section taken on line 2—2 of FIG. 1.

Referring now more particularly to FIGS. 1 and 2, there is shown at numeral 1 a tubular or barrel-shaped wing, preferably circular in right section, although equivalent multi-sided polygonal forms may be used. The wing 1 is axially formed as a hollow airfoil composed, for example, of a straight inside portion 3 with an inner upper flare 5 and having an inwardly converging exterior lower portion 7. The remainder of the outside shape is preferably approximately cylindrical, as shown at 9.

Along its lower margin 11 the wing 1 carries suitable rolling casters 13, located at 120° intervals for supporting the machine when on the ground 15, as indicated in FIG. 1. The walls of the wing 1 are provided with a suitable skin for minimizing air friction.

Mounted on a central axis of the barrel wing 1 is an assembly having sections A, B and C. Section C includes wing 1 and an engine compartment or housing 17 attached by means of crossed radial bracing cables 19 located substantially in a plane. These cables 19 are arranged so that torque may be transmitted in either direction between the wing 1 and the compartment 17. At numerals 21 are shown groups of axially disposed and triangulated cable braces adapted to support the barrel wing 1 in proper axial position relative to the compartment 17. Thus the barrel wing 1, the compartment 17 and parts affixed thereto form an integrally rotatable unit.

Within the compartment 17 is located an alternating-piston engine 23 such as shown, for example, in my United States patent application Serial No. 752,063, filed July 30, 1958, for Rotary Engine, eventuated as Patent 2,895,457. Complete details of the construction and characteristics of such an engine may be obtained from said application. Equivalent engines for the purpose may also be used. For the purpose of the present description, it is sufficient to note that such engines are constituted by alternately moving rotors such as shown at 25 and 27, carried on bearings 4 in frame parts 6 of engine 23 (FIG. 3). Each rotor 25 and 27 carries a plurality (such as two) of radial pistons. Pistons on the respective rotors interdigitate in alternate positions in an annular cylinder 29 which is affixed to the housing 17 by bracket means 33. Two of such pistons belonging to rotor 25 are shown oppositely at 31. The two interdigitating pistons (not visible) connected with rotor 27 are located crosswise with respect to the pistons 31 shown. Their operative arrangements for alternately driving the rotors 25 and 27 by explosions between their pistons will be clear from said application and the prior art as regards alternating-piston engines.

Attached to, and extending from the cylinder, are supports 35 and 37 for cam rings 39 and 41, respectively. The cam rings 39 and 41 are engaged by reverse-locking follower mechanisms 43 and 45 of the respective rotors 25 and 27 adapted to provide alternating reverse-locking actions of the rotors relative to the cylinder 29. As is clear from said application and the art, each rotor is alternately driven by an ignited compressed charge, acting on one of its pistons and reacting upon a piston on the other rotor, which is at such time locked to the engine frame. Motion is transmitted from the alternately driven rotors to a hollow shaft 47 through a differential drive mechanism indicated generally at 49. Complete details regarding the differential drive mechanism 49 may also be obtained from said application. Other such drive mechanisms appear in the art. When the engine is operating, its annular cylinder 29, and therefore the compartment 17, receives the reactive torque as the pistons are driven to apply driving torque to hollow shaft 47. Shaft 47 is supported in lower and upper bearings 51 carried in the compartment 17 and in bearings 2 within the rotors 25 and 27. End thrust bearings 52 are employed between shaft 47 and a lower wall of compartment 17. Attached to the shaft 47 on the exterior of the compartment 17 is a propeller 53, adapted to be driven by the shaft. The propeller is located at the trailing end of the wing 1 (FIGS. 1, 5 and 6).

One of the reasons for the use in the present aircraft of the alternating-piston engine shown in said application is that, unlike a reciprocating engine having a crankshaft, the power shaft of an alternating-piston engine may be made hollow, as shown, for the acceptance, as in the present invention, of a central landing gear plunger such as shown at 55. Attached to the lower end of the plunger is a solid head 57, to which is sealed a resilient inflatable dome 59. The sealing means is shown at 61, being in the form of wrapping forcing the margins of the dome airtightly in serrations 63 on the margin of the head 57. At 65 is shown an air inflation valve. The dome functions as a resilient buffer in connection with certain hydraulic buffering means described below.

As indicated in FIG. 3, the hollow shaft 47 extends upward into an upper part of the housing 17 where it is counterbored, as shown at 67, to provide space between it and plunger 55. The counterbore is provided with a row of openings 69, 69a. Upper opening 69a is preferably smaller than the remaining lower openings 69. The plunger 55, in its retracted position shown in FIG. 3, extends through the counterbore 67 past the openings 69, where it is provided below opening 69a with a piston head 71 forming a sealing engagement with the counterbore 67. The upper end of the hollow shaft 47 carries an enclosing head 73.

Surrounding the upper portions of the hollow shaft 47 (around the counterbore 67) is a cylinder 75, providing space between it and the outside of shaft 47. Cylinder 75 is closed at its upper end by a cap 72. At its lower end it is provided with packing 74, forming a seal between it and the hollow rotary engine shaft 47.

At numeral 77 is shown a sump containing a suitable hydraulic fluid adapted to operate piston 71. The sump 77 is connected with a lower port 83 through line 79 and a reversible, motor-driven, positive-displacement pump means 81, incorporating known flow cut-off means when not operating. Thus fluid under pressure may be introduced into the space between the cylinder 75 and the hollow shaft 47 and will force its way above piston 71, first through opening 69a. This drives down the plunger 55, as shown in FIG. 4, successive openings 69 being uncovered to admit increasing amounts of fluid. This forces out the buffer 59 to the position such as shown in FIGS. 4 and 5. By reversing the pump 81, plunger 55 and buffer 59 may be controllably retracted.

At 85 is shown a by-pass relief valve adapted to relieve pressure at, say, 10 p.s.i. Thus if the piston 71, plunger 55 and dome 59 are in the extended positions shown in FIGS. 4 and 5 and the aircraft lands, the buffer 59 will touch ground, forcing in the plunger 55. At this time the pump 81 will be shut off. Pressure engendered by upward movement of the piston 71 will open the relief valve 85 to return fluid to the sump 77. As successive openings 69 are traversed, increasing resistance to return movement of the fluid is met with, whereby a gradual buffered and shockless decelerating settling action is obtained upon landing. The last opening 69a is made smaller than the remaining openings 69 in order that final settling may be slow. It will be seen that rotation of the plunger 55 is indifferent with respect to the rotary hollow shaft 47 which drives the propeller 53. Thus when the dome 59 touches the ground, it is not positively driven to rotate by the shaft 47.

Attached on three transverse shafts 87, which extend between the walls of compartment 17 and barrel wing 1, are three sector-shaped lifting airfoils 89. It is to be understood that other numbers of them may be used.

Within the compartment 17, the transverse shafts 87 are provided with control means 91 for angularly changing the positions of the airfoils 89 around their axes. This is for the purpose of changing the angles of attack of the airfoils, as required. The control 91 may be constituted by bevel gears 93 on the shafts 87, interconnected by a bevel gear 95 driven through a shaft 97 by a suitable motorized control 99.

The compartment 17 carries an upper cylindrical hollow journal 101. This forms a bearing for an outer bearing sleeve 103 of a load compartment or housing 105, which with its contained parts forms section B. At 106 is shown a gimbal, swung on pivots 107 within the compartment 105 for supporting a pilot. Similar gimbals may be employed for other passengers and/or loads, if desired.

At the upper end of the compartment 105 is a bearing 109 containing a journal 111 extending in from a nose assembly 113, adapted either to be rotated or held fast to the compartment 105. This nose assembly and attached parts constitutes section A. Rotation or holding of assembly A relative to assembly B may be accomplished by a bevel gear 115 attached to the nose assembly 113. Gear 115 meshes with a bevel pinion 117, the latter being adapted to be held fast, or rotated from a motorized control 119. Thus when the pinion 117 is rotated, the nose assembly 113 may be adjusted with respect to the compartment 105 into any position over a 360° range, in which position it is adapted to be locked by holding pinion 117 stationary.

On the nose assembly 113 are transverse bearings 121 for transverse shafts 123 of airfoils 125, adapted to function as elevators or ailerons. Rotary adjustments of the shafts 123 may be accomplished together or oppositely, in order that the airfoils 125 may be angled together (as elevators) or oppositely of one another (as ailerons). This may be accomplished by gears 127 supported on the shafts 123 and meshed with pinions 129, the rotations of which may be independently controlled from a dual-motor control means 131.

Figure 7:
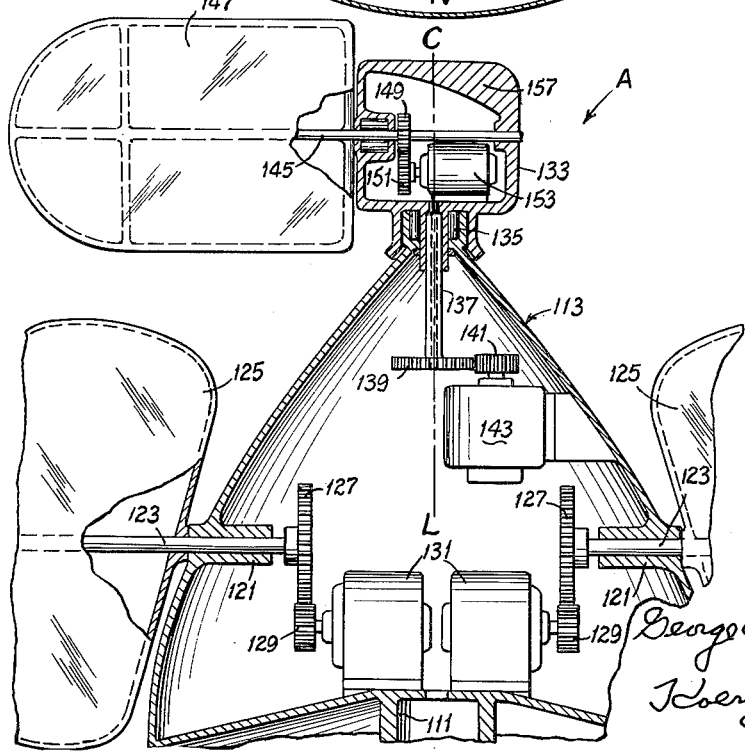
FIG. 7 is an enlarged fragmentary axial section of certain parts shown at the upper end of FIG. 1.

As illustrated in FIGS. 1 and 7, a rotatable housing 133 is carried in bearings 135 at the end of the nose assembly 113. A hollow drive shaft 137 extends from housing 133 into the assembly 113 and is there provided with a gear 139 meshing with a pinion 141 of a motor control 143, whereby the housing 133 may be rotated relative to the nose assembly 113. The housing 133 also rotatably supports a transversely extending shaft 145 which carries an impeller 147 which extends eccentrically to center line CL. Center line CL constitutes an axis of spin of the entire craft. On shaft 145 is a gear 149, meshing with a pinion 151 of a motorized control 153 by means of which the angular position of the impeller 147 may be adjusted around shaft 145. The housing 133 is formed with a counterweight 157 for dynamically balancing it and the eccentrically extending impeller parts carried thereby as they rotate relative to the nose assembly 113 around the axis of spin CL. Thus by control 153 the impeller 147 may be adjustably angled around the center line or shaft 147 and held in any selected position. In any such selected position it may be continuously revolved by motor 143 in an eccentric sweep around the axis of spin CL.

Referring again to FIG. 1, there is shown at numeral 159 a transverse airfoil mounted upon a shaft 161 in housing 105. This airfoil 159 has its angular position on the axis of shaft 161 controlled by a bevel gear train 163 driven from a motor control 165.

It will be understood that suitable electrical means may be interconnected to the various motorized controls diagrammatically shown, so that a pilot from a location therein may control the various elements described. Further details of the controls and associated electrical means, means for generating current therefor from the engine 23, batteries and the like will not be necessary, since their provision is within the skill of those familiar with the aeronautical art.

The functions of the various parts above-described are as follows: Upon operation, the alternating-piston engine 23, by reaction between its thrust components, drives the hollow shaft 47 in one direction (for example, clockwise, viewed from above in FIG. 2). This drives the propeller 53 clockwise (see dart a). Reaction is taken by barrel wing section C from the annular cylinder 29 through brackets 33. A down draft of air tends to be formed in the barrel wing 1, is illustrated by darts b in FIG. 1. The engine reaction torque accelerates the section C in rotation (anticlockwise), as shown by the darts c (FIG.

2). This revolves the airfoils 89 around the axis CL. By adjusting the airfoils 89 around shafts 87 for various angles of attack, their resulting lifting effects may be controlled.

Under these rotating conditions, the nose assembly 113 is locked with respect to the housing 105 by establishing a fixed condition of the control 119 and gears 115 and 117. The motor control 131 is fixed so as to hold the elevators 125 in a plane containing the center line CL. The motor control 143 is caused continuously to rotate the small housing 133, which revolves the impeller 147. By adjusting the pitch and hence the angle of attack of the impeller 147, a suitable down draft of air may be established such as shown by darts d, which by impingement as a slip stream upon foil 159 may be made to offset any rotary drag of section C on section B. Thus when foil 159 is properly adjusted from motor control 165, clockwise torque on housing 105 prevents that housing from being rotated by anticlockwise frictional drag between bearing 103 and journal 101. When later the craft is moving along the axis CL, this action of the impeller 147 is not required, because the normal slip stream of the air due to movement therethrough produces the desired slip stream d. Under the latter conditions the airfoil 159 is readjusted. The impeller 147 will then preferably be adjusted from motor control 143 into a position parallel to and containing the center line CL. It is to be understood, however, that the impeller 147 will still be rotated to sweep as a paddle in the clockwise direction opposite to the rotation of the barrel wing 1 for stabilizing purposes to be described.

Initially, while section C is reactively rotating, the lifting airfoils 89 are set into the solid-line position shown in FIG. 1 at or near a horizontal plane, that is, at an angle of attack near zero, in order to prevent immediate rise of the craft.

Hereinafter any rotation referred to as being absolute means rotation with respect to the earth. Other motions are referred to as being relative between parts. At the start (assembly C stationary), the propeller speed may be 2,000 r.p.m. absolute; i.e., relative to stationary assembly C and the earth. Reaction due to driving the propeller accelerates the rotation of assembly C until it acquires an opposite absolute rotation of 700 r.p.m., i.e., relative to the earth. This establishes conditions for take-off, wherein the absolute propeller speed will be 1,300 r.p.m., assembly C rotating oppositely at 700 r.p.m. absolute.

The moment of inertia of the assembly C (including wing 1, housing 17, and the reactive components of engine 23 which are connected therewith) is substantially larger than the moment of inertia of the propeller assembly (including component engine parts attached thereto and rotating therewith). Therefore, when the engine 23 is started, the propeller assembly will initially rotate rapidly in its anticlockwise direction and the assembly C will relatively slowly accelerate reversely until the above-outlined conditions for take-off are reached.

If required, initial adjustments of the airfoils 89 may be such as to provide a small negative angle of attack of these. This provides a downward force for steadying the machine during warm-up. Under these conditions, the machine will not rise and the pilot has time within which to test the proper functioning of the various parts and to obtain steady-state operating conditions. It is during this interval only that the impeller 147 is required by appropriately adjusting its pitch to provide the slip stream d upon the airfoil 159, so as to prevent the section B from rotating. However, this provision of a temporary slip stream is not the only function of the impeller 147, as will appear. Thereafter this slip stream is provided by motion of the craft along its trajectory. If desired, at the instant of take-off the plunger 55 may be driven from the hollow shaft 47 so as to boost the take-off, or at least remove the casters 13 from the surface 15 during final adjustments of the speeds of rotation of the various parts.

Upon increase of the angle of attack of airfoils 89, the craft rises, the engine supplying kinetic energy to the rotary system as fast as it is drawn off by the process of conversion to potential energy of elevation. During vertical lift the upward thrust which overcomes weight may be approximately one-half that of the lifting air coils 89 (set at a positive angle of attack) operating as helicopter blades, the additional one-half of the upward thrust being obtained from the propeller 53.

As the machine moves, the impeller 147 is adjusted to a plane parallel to the axis CL and is caused to revolve reversely to the rotation of section C. The purpose of this revolving sweep action of the impeller 147 is to stabilize the axis CL against yawing. The speed of revolution of impeller 147 depends upon the area of the impeller and the degree of the unstabilizing force. In the present example, the impeller 147 may rotate at 700 r.p.m. absolute. The explanation of the stabilizing action against yawing when impeller 147 is caused to rotate reversely to the rotation of barrel wing section C is as follows: Any incipient yawing action, caused for example by application of tilting torque (as around line N) may cause axis CL to angle, as for example anticlockwise in the plane of the paper (FIG. 1). This results in an incipient precessive movement normal to such a plane as around line M, as determined primarily by the gyroscopic action of the wing section C. According to the example, the portion of CL above N would then tend to rise above the plane of the paper and its portion below N would tend to sink below this plane. But the opposite rotation of impeller 147 by reaction from the air which it moves normal to its face applies reactive force in the direction of the unstabilizing precessive movement. Thus again according to the example, reaction pressure under 147 in the position shown is up out of the plane of the paper. This tends to hurry or accelerate the precession. In other words, the incipient tendency of the portion of CL above N to rise is hurried or accelerated. Any tendency to hurry an incipient precession in a gyrocopically acting system tends to produce a gyroscopic reaction to the applied torque and if sufficient, to offset or balance it. In the present application of this principle, the applied torque causing the yawing is any instability that may occur in the system of parts rotating about axis CL. Thus rotation of the impeller 147 in the stated direction engenders torque which offsets the unstabilizing torque and prevents any incipient yawing action from building up to deleterious values. This stabilizing action may be obtained at any time that the engine is operating, whether the craft is settled on the ground or in flight, simply by revolving the impeller 147 at sufficient speed in the direction stated, regardless of its particular angled position around transversely extending shaft 145.

The stabilizing action may also be described in another manner. The initial undisturbed position of line CL may be referred to as an axis of nutation around which conical wobble or nutation occurs when a disturbing force is applied tending to angle CL away from this initial position. For example, the action of the slip stream over sections A and B may cause such nutation, being represented by a vector pointing along axis CL but which takes up successive positions around this axis as nutation continues. This is called a first rotating vector. The air reaction on member 147, when it is rotated oppositely to rotation of wing 1, induces a second rotating vector at right angles to the first rotating vector, and tends to hurry the nutation (or continuing precession). This second rotating vector exerts a moment around the axis of nutation. When of sufficient value, determined by the speed of reverse rotation of member 147, the nutation is accelerated sufficiently to cause nutating line CL to approach its initial stable position shown in FIG. 1, this position defining what above has been called the axis of nutation.

After the machine has risen a desired amount, it is intended that it shall be tilted into the aspect shown in FIG. 6 for cruising. The type of maneuver for this purpose is described in detail in my said Patent 2,874,920 and further elaboration will not be required except to state that the maneuver is executed by adjusting the airfoils 125 to a common plane, angled with respect to axis CL, say, for example, to lift 113 out of the plane of the paper. This will result in a torque due to air reaction being applied around axis M, shown for example in FIGS. 1 and 2. Axis M passes through the center of gravity of the craft. This may be referred to as the axis of applied torque. This tends to rotate the machine in a plane containing center line CL. The torque causing this rotation is resisted by the reactive gyroscopic couple of the spinning system constituted by section C. The result will be a gyroscopic precession of the machine as a whole around axis N normal to the plane of applied torque.

Thus the craft may be caused to assume the attack aspect illustrated in FIG. 6 for horizontal or near horizontal cruising. It will be understood that the moment of inertia of all parts rotating oppositely to section C is comparatively small, and therefore any opposite precessive tendencies due to the opposite rotations are small and merely parasitic, not controlling of the main maneuvers. It is to be understood, however, that the stabilizing action of the revolving impeller 147 is effective during all maneuvers, as required. After the aspect of FIG. 6 has been assumed, the barrel wing 1, by reason of its attack angle to the air, suspends the craft, aided somewhat by the attack action of the portions constituting sections A and B.

In the FIG. 6 aspect of the craft, the airfoils 89 are placed in feathered positions. When the airfoils 89 are feathered the speed of rotation of the assembly of section C is reduced. The value of this angular velocity is arbitrary, but selected to avoid roll-off of the barrel wing 1 transversely to the air slip stream. Under the conditions shown in FIG. 6, all the thrust for propulsion is obtained from rotation of propeller 53. At this time, gravity action of suspended parts such as gimbal 106 in the housing 105 maintains them horizontal. The plane of the airfoil 159 may be set parallel to line CL, so that the air slip stream has a steadying action. Airfoils 125 at this time function together as elevators. The speed of impeller 147 may be adjusted from time to time for optimum correction of instability of the axis of spin CL.

Maneuvers along a more or less horizontal trajectory may be accomplished by the members 125 acting also as ailerons, each being reversely adjustable with respect to the other.

In order to land the craft, the nose assembly 113 is rotated until the members 125, acting as elevators, are in a more or less vertical plane. They are then angled together to apply more or less horizontal torque to apply gyroscopic precession adapted to lift the forward nose parts of the machine until the axis CL is upright. At this time the lifting airfoils 89 are set for a positive angle of attack and the angle decreased for gradual descent in the upright aspect. During the descent the plunger 55 is extended, as illustrated in FIG. 5. First contact with the ground surface 15 is then made by the resilient buffer 59. Upon contact, the plunger 55 is driven without shock into the hollow shaft 47, thus driving liquid through the ports 69 into the sump 77 through the relief valve 85. As successive ports 69 are covered, the rate of movement of plunger 55 into hollow shaft 47 is reduced, due to the increasing resistance against fluid flow. Finally, the casters 13 come into contact with the surface 15. During the interval that the plunger 55 is being driven into the hollow shaft 47, speed of rotation of propeller 53 and section C may be diminished.

Further detailed discussion of maneuvers possible by adjustment of the members such as 125 will be clear from said Patent 2,874,920.

Figure 8:
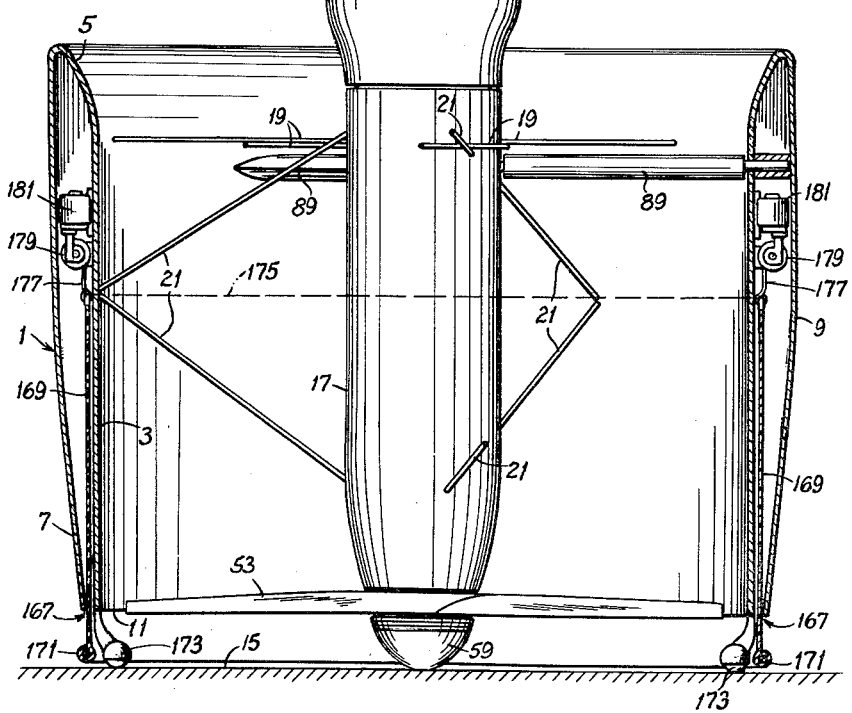
FIG. 8 is a side elevation partly in section, showing an alternative landing feature; and, FIG. 9 is a side elevation on a reduced scale, showing the alternative feature of FIG. 8 under landing conditions.

In FIGS. 8 and 9 are illustrated an added buffering landing arrangement. In these figures, like numerals designate like parts. In this case the hollow wing 1 is circularly slotted at its bottom, as shown at numeral 167, for the telescopic reception within the wing of a tubular rubber skirt 169, the lower end of which is provided with a scuff bead 171, surrounding casters 173. This skirt at its upper margin 175 is supported by a plurality of flexible connectors 177, mounted on drums 179 adapted to be rotated reversibly by reversible electric motors 181. These motors, under one direction of movement, draw the skirt 169 upward into telescopic relation to the wing 1 as shown in FIG. 8, and when driven in the reverse direction allow its outward movement to an extended position as shown in FIG. 9. During take-off and flight, skirt 169 is telescoped into the wing. Preparatory to landing, it is allowed to move out so that it forms a resilient downward extension from the wing, as shown in FIG. 9. Downward air flows through the wing 1 and the extension as a ground approach is made finally moving out radially under the skirt 169. Under conditions of final approach the confined air will tend to bulge or balloon the skirt, as indicated at 183 in FIG. 9. The radial outflow of the air serves as an additional buffer and stabilizer for the craft as it settles into final landing position with the casters 173 on the ground. The outward bulging or ballooning action allows the skirt to keep substantially clear of the ground during the final settling of the craft.

In view of the above, it will be seen that the improvements afforded by the invention over the construction shown in said Patent 2,874,920 consist in:

First, improved stability of motion of the craft along all parts of its trajectory, either when ascending vertically, moving angularly, turning, or cruising more or less horizontally;

Second, more positive maintenance of a proper position of the housing of the load section B, both on the ground and when the craft is moving through any part of its trajectory; and, Third, improved ease with which the craft may execute landing and take-off operations, noting that the buffer shaft may be thrust out upon take-off in order to assist lift.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An aircraft construction comprising in combination a rotary alternating-piston engine having a hollow drive shaft and an annular cylinder, first and second assemblies connected for opposite rotations about an axis of spin, the first of which assemblies includes said hollow shaft and a propeller connected therewith, the second assembly including a barrel-shaped wing surrounding said axis of spin and having said engine cylinder fixed relative thereto, said second assembly including at least one lifting airfoil rotatable on an axis which is fixed relative to said second assembly and which extends transversely to said axis of spin, a landing plunger in and extending from said hollow engine shaft, and control means adapted to extend and retract said plunger with respect to the hollow shaft.

2. An aircraft construction according to claim 1, including buffering means adapted to buffer said plunger against landing shocks.

3. An aircraft construction according to claim 2, wherein said control means is fluid operated to provide buffering action.

4. An aircraft construction according to claim 3, including a resilient earth-contacting head on said plunger.

5. An aircraft construction comprising in combination a rotary alternating-piston engine having a hollow drive shaft and an annular cylinder, first and second assemblies connected for opposite rotations about an axis of spin, the first of which assemblies includes said hollow shaft and a propeller connected therewith, the second assembly including a barrel-shaped wing surrounding said axis of spin and having said engine cylinder fixed relative thereto, said second assembly including at least one lifting airfoil rotatable on an axis which is fixed relative to said second assembly and which extends transversely to said axis of spin, a landing plunger in and extending from said hollow shaft, control means adapted to move said plunger in and out of the hollow shaft, said control means comprising a piston head on the plunger fitted within a closed-end cylindric portion in the shaft, at least one port in said cylindric portion, and fluid pressure means and pressure relief means both of which have connection with said port.

6. An aircraft construction comprising in combination a rotary alternating-piston engine having a hollow drive shaft and an annular cylinder, first and second assemblies connected for opposite rotations about an axis of spin, the first of which assemblies includes said hollow shaft and a propeller connected therewith, the second assembly including a barrel-shaped wing surrounding said axis of spin and having said engine cylinder fixed relative thereto, said second assembly including at least one lifting airfoil rotatable on an axis which is fixed relative to said second assembly and which extends transversely to said axis of spin, a landing plunger in and extending from said hollow shaft, control means adapted to move said plunger in and out of the hollow shaft, said control means comprising a piston head on the plunger fitted within a closed-end cylindric portion in the shaft, an axially extending sequence of ports in said cylindric portion adapted to be traversed by said head, and fluid pressure means and pressure relief means both of which have connections with said ports.

7. An aircraft construction comprising in combination first and second assemblies connected for opposite rotations relative to a third assembly and around an axis of spin, the first of which assemblies includes a propeller, the second assembly including a barrel-shaped wing surrounding said axis of spin, an engine having reactive power elements connected respectively with said assemblies, said second assembly including at least one lifting airfoil rotatable on an axis which is fixed relative to said second assembly and which extends transversely to said axis of spin, and an air impeller extending eccentrically from said third assembly and in a direction away from said axis of spin adapted to be revolved in a direction opposite to the direction of rotation of said second assembly.

8. An aircraft construction comprising in combination first and second assemblies connected for opposite rotations relative to a third assembly and around an axis of spin, the first of which assemblies includes a propeller, the second assembly including a barrel-shaped wing surrounding said axis of spin, an engine having reactive power elements connected respectively with said assemblies, said second assembly having a moment of inertia greater than that of the first assembly and including several lifting airfoils rotatable on axes which are fixed relative to said second assembly and which extend transversely to said axis of spin, and an air impeller extending on an axis eccentrically from said third assembly and in a direction away from said axis of spin adapted with said last-named axis to be revolved in a direction opposite to the direction of rotation of said second assembly.

9. An aircraft construction comprising in combination first and second assemblies connected for opposite rotations about an axis of spin, the first of which assemblies includes a propeller, the second assembly including a barrel-shaped wing surrounding said axis of spin, an engine having reactive power elements connected respectively with said assemblies, said second assembly including at least one lifting airfoil rotatable on an axis which is fixed relative to said second assembly and which extends transversely to said axis of spin, a housing having a rotatable connection with said second assembly around the axis of spin, a nose assembly on the housing, oppositely directed adjustable airfoils rotatably mounted on said nose assembly around axes extending transversely to said axis of spin, an impeller adjustably mounted around an axis extending eccentrically and transversely from said nose assembly and adapted to be swept around said axis of spin in a direction opposite to the direction of rotation of said second assembly, and an airfoil extending transversely from the housing adapted to be impinged upon by an air slip stream from said impeller or the air slip stream of the aircraft when in motion to prevent housing rotation.

10. An aircraft construction comprising in combination housing means, first and second assemblies connected for opposite rotations relative to the housing means about an axis of spin, a driving engine therefor, the first of which assemblies includes a propeller connected therewith, the second assembly including a barrel-shaped wing surrounding said axis of spin, said second assembly including at least one lifting airfoil rotatable on an axis which is fixed relative to said second assembly and which extends transversely to said axis of spin, and an impeller extending eccentrically from the housing means, said impeller being revolvable oppositely to the rotation of the barrel wing and adapted to be swept through the air around said axis of spin to offset unstabilizing gyroscopic forces.

11. An aircraft construction comprising a barrel-shaped wing surrounding an axis of spin and including a propeller therein adapted to move air through the wing, means adapted to land the craft with the trailing end down, a flexible tubular skirt adapted to be telescoped with and extended from the trailing end of said wing adapted to stabilize the aircraft during landing by combining air flow from said trailing end to expand the skirt and to escape radially from its extended margin upon ground approach.

12. An aircraft construction comprising in combination first and second assemblies, bearing means connecting said assemblies adapting them for opposite rotation about an axis of spin, an engine having first and second reactive rotary thrust components, the first assembly comprising a propeller and said first thrust component attached thereto, the second assembly comprising a barrel-shaped wing surrounding said axis of spin with the second thrust component attached thereto and including at least one lifting airfoil rotatable on an axis which is fixed relative to said second assembly and which extends transversely to said axis of spin, said propeller being adapted to move air through said barrel-shaped wing from its leading to its trailing edge, a flexible tubular skirt surrounding said axis of spin and adapted to telescope with the wing or extend from its trailing end to stabilize the aircraft during landing by confining air flow from said trailing end to expand the skirt upon ground approach and escape radially from its extended margin.

13. An aircraft construction according to claim 12, including a buffering plunger movable into and out of said first assembly along said axis and within said skirt.

No references cited.